(No Model.)

J. LEVEY.
CHEESE RACK.

No. 591,671.  Patented Oct. 12, 1897.

WITNESSES:

INVENTOR
J. Levey.

BY

ATTORNEYS.

THE NORRIS PETERS CO., PHOTO-LITHO., WASHINGTON, D. C.

UNITED STATES PATENT OFFICE.

JOHN LEVEY, OF LINDSAY, CANADA, ASSIGNOR OF ONE-HALF TO FRANK CURTIS, OF SAME PLACE.

CHEESE-RACK.

SPECIFICATION forming part of Letters Patent No. 591,671, dated October 12, 1897.

Application filed October 31, 1896. Serial No. 610,675. (No model.) Patented in Canada August 12, 1896, No. 53,222.

*To all whom it may concern:*

Be it known that I, JOHN LEVEY, of Lindsay, in the Province of Ontario and Dominion of Canada, have invented a new and Improved Cheese-Rack, (for which I have obtained Letters Patent in Canada, No. 53,222, dated August 12, 1896,) of which the following is a full, clear, and exact description.

The object of the invention is to provide a new and improved cheese-rack designed for conveniently and properly supporting the cheese while curing it to insure proper drying and produce cheese of a uniform quality without requiring much hand-labor.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
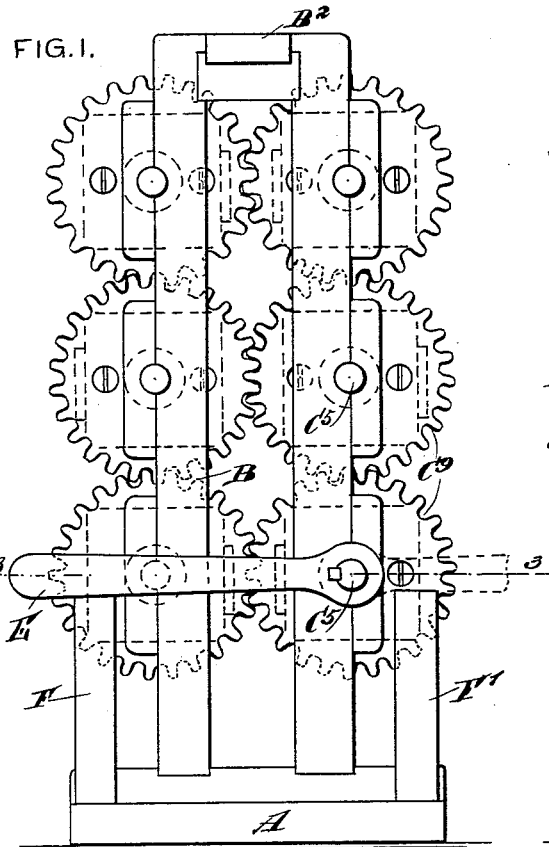
Figure 2:
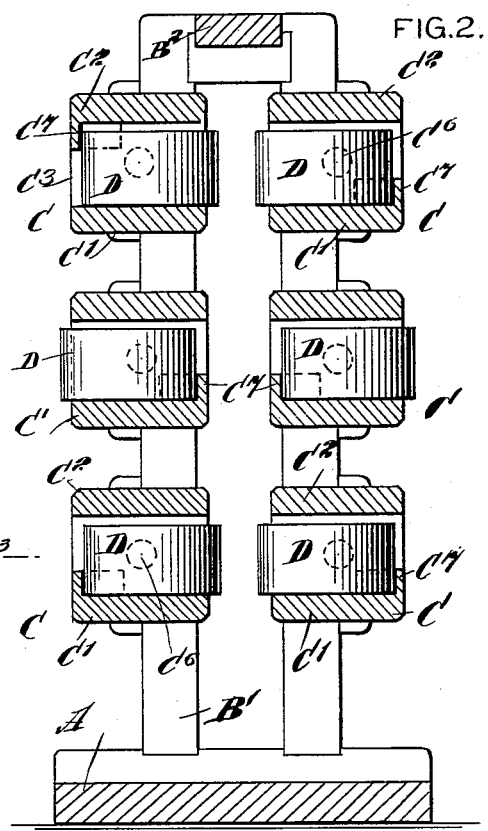
Figure 3:
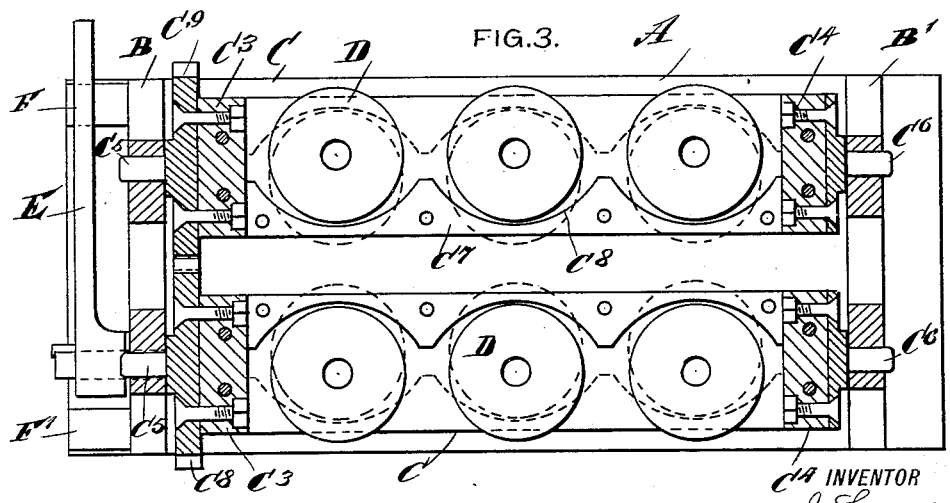

Figure 1 is an end elevation of the improvement. Fig. 2 is a transverse section of the same, and Fig. 3 is a sectional plan view of the same on the line 3 3 of Fig. 1.

The improved cheese-rack is provided with a base A, on which are erected the standards B and B', connected with each other at the top by a beam $B^2$. In the standards B and B' are journaled racks C, preferably arranged in pairs located one above the other, as plainly indicated in the drawings. Each of the racks C is provided with a bottom C' and a top $C^2$, connected with each other at their ends by the end pieces $C^3$ $C^4$, so as to hold the said bottoms and tops a sufficient distance apart to permit of conveniently introducing the cheese D between the top and the bottom, so as to support the cheese on one side, the other side being exposed to the air.

On the end pieces $C^3$ $C^4$ are secured the journals $C^5$ $C^6$, respectively, engaging suitable bearings in the standards B B', and between the top and bottom of each rack and on one side thereof is arranged a back $C^7$, secured to either the top or bottom to form a stop for the cheese when the racks are turned, as hereinafter more fully described. The inner face of each back $C^7$ is formed with curved recesses $C^8$ for producing connected compartments in each rack, each compartment being adapted to receive a single cheese, as indicated in the drawings. The other side of the rack is open for placing the cheese on the rack or for removing the same therefrom. On the journals $C^5$ are formed or secured gear-wheels $C^9$ in mesh with one another, and on one of the journals $C^5$ is secured a hand-lever E, adapted to be taken hold of by the operator to give a half-turn to the lever, so as to reverse the several racks simultaneously in such a manner that their tops become the bottoms and the bottoms the tops. The hand-lever E is limited in its motion by stops F and F', held on the base A. Now it will be seen that by the arrangement described the operator in turning the hand-lever E causes the several racks to make one half-turn in such a manner that the backs $C^7$ move into a lowermost position and temporarily support the cheese on their peripheral surface until a half-revolution is completed, the cheese then passing upon the former top as the support, the former top of the cheese now becoming the bottom, the former bottom being exposed to the atmosphere. Thus it will be seen that by the arrangement described the operator by simply manipulating the hand-lever E simultaneously turns the several racks, so as to support the cheese on opposite sides and prevent moisture from settling too much on the under side and leaving the top too dry. When the cheese has been cured, then the racks C are turned into such position that their open sides extend outward, as indicated by the middle racks (shown in Fig. 2) to permit of conveniently removing the cheese from the racks.

Having thus fully described my invention, I claim as new and desire to secure by Letters Patent—

1. A cheese-rack comprising a frame, a series of racks each journaled independently in said frame and each having a bottom and top for alternately supporting a cheese on its sides, and means for turning the said racks in unison, substantially as shown and described.

2. A cheese-rack comprising a supporting-frame, a series of racks having bottoms and tops and each journaled at its ends in the said frame, and gear-wheels carried by the journals at one end of the said racks, the said gear-wheels meshing with each other whereby the said racks may be turned in unison, substantially as described.

3. A cheese-rack comprising a supporting-frame, a series of racks each provided with a top and bottom connected by end pieces, the racks being each provided with a back arranged between the top and bottom at one side, journals secured to the end pieces of the racks and engaging suitable bearings in the said frame, gear-wheels carried by the journals at one end of the racks, the said gear-wheels meshing with each other, and a hand-lever secured to one of the journals whereby the several racks may be reversed, substantially as described.

JOHN LEVEY.

Witnesses:
ALEX. JACKSON,
JAMES ALBERT PEEL.